US012766356B2

(12) United States Patent
Borraccino

(10) Patent No.: US 12,766,356 B2
(45) Date of Patent: Oct. 20, 2026

(54) ATOMIZER NOZZLE

(71) Applicant: TEMA SISTEMI S.P.A., Russi (IT)

(72) Inventor: Cataldo Borraccino, Taranto (IT)

(73) Assignee: TEMA SISTEMI S.P.A., Russi (IT)

( * ) Notice: Subject to any disclaimer, the term of this patent is extended or adjusted under 35 U.S.C. 154(b) by 358 days.

(21) Appl. No.: 18/206,811

(22) Filed: Jun. 7, 2023

(65) Prior Publication Data

US 2024/0198156 A1 Jun. 20, 2024

(30) Foreign Application Priority Data

Dec. 20, 2022 (IT) ........................ 102022000026025

(51) Int. Cl.
*A62C 37/14* (2006.01)
*A62C 31/05* (2006.01)
(Continued)

(52) U.S. Cl.
CPC .............. *A62C 37/14* (2013.01); *A62C 31/28* (2013.01); *A62C 37/04* (2013.01); *A62C 37/09* (2013.01);
(Continued)

(58) Field of Classification Search
CPC ......... A62C 37/14; A62C 31/28; A62C 37/04; A62C 37/09; A62C 37/20; A62C 37/48;
(Continued)

(56) References Cited

U.S. PATENT DOCUMENTS 3,714,989 A 2/1973 Gloeckler
3,756,321 A * 9/1973 Gloeckler .............. A62C 37/09 169/40

(Continued)

FOREIGN PATENT DOCUMENTS

JP 2009-207630 A 9/2009
KR 100 468 020 B1 1/2005

(Continued)

OTHER PUBLICATIONS

Extended European Search Report dated Aug. 8, 2023 received in European Application No. 23 17 7958.8.

(Continued)

*Primary Examiner* — Kevin Edward Schwartz
(74) *Attorney, Agent, or Firm* — Scully, Scott, Murphy & Presser, P.C.

(57) ABSTRACT

An atomizer nozzle for the automatically dispensing of a liquid comprises: a main body; a dispensing head; and a locking assembly. The main body comprises: an inlet configured to be supplied with the liquid; an outlet; and a cavity extending from the inlet to the outlet. The dispensing head, movable along the cavity, is configured to dispense the liquid beyond the outlet, outside the atomizer nozzle. The locking assembly comprises a thermosensitive element configured to break at a predetermined temperature. The locking assembly is configured to: lock the dispensing head in a locked position at a distance from the outlet; and automatically release the dispensing head from the locked position when the thermosensitive element reaches the predetermined temperature. The dispensing head is further configured to move along the cavity when released, thereby reducing the distance until it is eliminated, and to dispense the liquid by protruding from the outlet.

14 Claims, 11 Drawing Sheets

(51) Int. Cl.
*A62C 31/28* (2006.01)
*A62C 37/09* (2006.01)
*A62C 37/20* (2006.01)
*A62C 37/36* (2006.01)
*A62C 37/48* (2006.01)

(52) U.S. Cl.
CPC .............. *A62C 37/20* (2013.01); *A62C 37/48* (2013.01); *A62C 31/05* (2013.01)

(58) Field of Classification Search
CPC ......... A62C 31/05; A62C 35/68; A62C 35/08; A62C 37/12; B05B 1/14; B05B 15/70
USPC ...... 169/58, 37, 19, 40, 38; 239/208; 137/79
See application file for complete search history.

(56) References Cited

U.S. PATENT DOCUMENTS

| | | | | | |
|---|---|---|---|---|---|
| 3,811,511 | A * | 5/1974 | McCulloch | A62C 37/14 | 340/591 |
| 3,998,273 | A * | 12/1976 | Juliano | A62C 37/12 | 169/42 |
| 4,105,076 | A * | 8/1978 | Simons | A62C 37/09 | 169/42 |
| 4,228,859 | A * | 10/1980 | Hattori | A62C 37/12 | 169/57 |
| 4,376,465 | A * | 3/1983 | Simons | A62C 37/12 | 169/39 |
| 4,440,234 | A * | 4/1984 | Shea | A62C 37/12 | 169/39 |
| 4,508,175 | A * | 4/1985 | Pieczykolan | A62C 37/09 | 169/38 |
| 4,590,999 | A | 5/1986 | Snaper | | |
| 4,619,327 | A * | 10/1986 | Pieczykolan | A62C 37/14 | 169/38 |
| 6,554,077 | B2 * | 4/2003 | Polan | A62C 37/14 | 169/57 |
| 6,868,917 | B2 * | 3/2005 | Meyer | A62C 37/11 | 169/41 |
| 10,179,255 | B2 * | 1/2019 | Almeida | A62C 35/68 | |
| 2012/0285707 | A1 * | 11/2012 | Kameishi | A62C 37/12 | 169/39 |
| 2014/0231105 | A1 | 8/2014 | Helasuo et al. | | |
| 2016/0023029 | A1 | 1/2016 | Almeida et al. | | |
| 2017/0259096 | A1 | 9/2017 | Laube | | |

FOREIGN PATENT DOCUMENTS

| | | | |
|---|---|---|---|
| KR | 100 932 100 | B1 | 12/2009 |
| WO | 2022/167858 | A1 | 8/2022 |

OTHER PUBLICATIONS

European Examination Report dated May 19, 2026 received in European Application No. 23 177 958.8.

* cited by examiner

ATOMIZER NOZZLE

The present invention relates to an atomizer nozzle for the automatic dispensing of a liquid, in particular water. The atomizer nozzle according to the present invention is particularly, although not exclusively, useful and practical for use in systems for extinguishing fires, or fire-fighting systems for short, that are activated electrically and automatically.

As is known, in industrial environments, and not only, automatically-activated fire-fighting systems are normally present which emit water, preferably sprayed water, upon the occurrence of a condition like, for example, the detection of a fire or the exceeding of a preset air temperature threshold, in order to extinguish the fire.

The dispensing of water occurs by way of nozzles which usually are positioned on the false ceiling or ceiling, or on another elevated supporting structure, of a room.

In more detail, these nozzles of known type normally comprise a body having a cylindrical, frustoconical, or similar shape—which at one end has an inlet connected to a supply duct of the fire-fighting system, and at the other end has an outlet from which the jet of water is dispensed.

The outlet is conveniently dimensioned and shaped to cause the atomization of the water when the water is dispensed.

Although useful and practical, these nozzles of known type are not devoid of drawbacks, which include the fact that they are visible, and thus unsightly, inside a room, as a consequence of their placement or installation on the false ceiling or ceiling of the room.

Another drawback of the nozzles of known type consists in that they take up space in a room, as a consequence of their placement or installation on the false ceiling or ceiling of the room.

A further drawback of the nozzles of known type consists in that their activation depends on a fire-prevention sensor of a fire-fighting system, for example a smoke detector or a temperature sensor, and also on an electronic control unit of the fire-fighting system, which is configured to activate the nozzles remotely, bringing the nozzles to a dispensing status when the fire-prevention sensor identifies a fire, for example by detecting the presence of smoke in the air or by detecting the exceeding of a preset air temperature threshold.

Another drawback of the nozzles of known type consists in that the operations required for their maintenance are very complex and/or require a great deal of time.

The aim of the present invention is to overcome the above-described limits of the known art, by devising an atomizer nozzle for the automatic dispensing of a liquid that makes it possible to obtain better effects with respect to those that can be obtained with conventional solutions and/or similar effects at lower cost and with higher performance levels.

Within this aim, an object of the present invention is to conceive of an atomizer nozzle for the automatic dispensing of a liquid that, as a consequence of its placement or installation, can be at least partially, preferably completely, contained, and therefore concealed, in the false ceiling or ceiling of a room.

Another object of the present invention is to devise an atomizer nozzle for the automatic dispensing of a liquid that, when the atomizer nozzle is activated (and thus is placed) in a dispensing status, protrudes at least partially from the false ceiling or ceiling of a room.

A further object of the present invention is to devise an atomizer nozzle for the automatic dispensing of a liquid that can be autonomously activated, and thus can autonomously proceed to a dispensing status, therefore independently of an optional fire-prevention sensor and an optional electronic control unit of a fire-fighting system, if any.

Still further, another object of the present invention is to devise an atomizer nozzle for the automatic dispensing of a liquid that is relatively simple to maintain.

Another object of the present invention is to provide an atomizer nozzle for the automatic dispensing of a liquid that is highly reliable, easy and practical to realize, and economically competitive when compared to the known art.

This aim and these and other objects which will become better apparent hereinafter are achieved by an atomizer nozzle for the automatic dispensing of a liquid, in particular for fire-fighting systems, that comprises:

- a main body, comprising:
  - an inlet, configured to be fed with said liquid;
  - an outlet; and
  - a cavity, which extends from said inlet to said outlet;
- a dispensing head, movable along said cavity, said dispensing head being configured to dispense said liquid beyond said outlet and, therefore, outside said atomizer nozzle; and
- a locking assembly, configured to lock said dispensing head in a locked position at a distance from said outlet;
- characterized in that
- said locking assembly comprises a thermosensitive element configured to break at a predetermined temperature, said locking assembly being further configured to automatically release said dispensing head from said locked position when said thermosensitive element reaches said predetermined temperature; and
- said dispensing head is further configured to:
  - move along said cavity when released, thereby reducing said distance until said distance is eliminated, and
  - dispense said liquid by protruding from said outlet.

The set aim and objects are also achieved by a kit which comprises a gripping tool and said atomizer nozzle for the automatic dispensing of a liquid.

The set aim and objects are also achieved by a fire-fighting system, which comprises an atomizer nozzle for the automatic dispensing of a liquid.

Further characteristics and advantages of the present invention will become more apparent from the description of a preferred, but not exclusive, embodiment of the atomizer nozzle according to the invention, illustrated by way of non-limiting example with the aid of the accompanying drawings wherein:

FIGS. 1C and 1D are longitudinal cross-sectional views—the former being an assembly view and the latter being a detailed view—of the atomizer nozzle shown in FIGS. 1A and 1B, wherein FIGS. 1C and 1D are rotated by 90° with respect to FIGS. 1A and 1B, respectively;

Figure 1A:
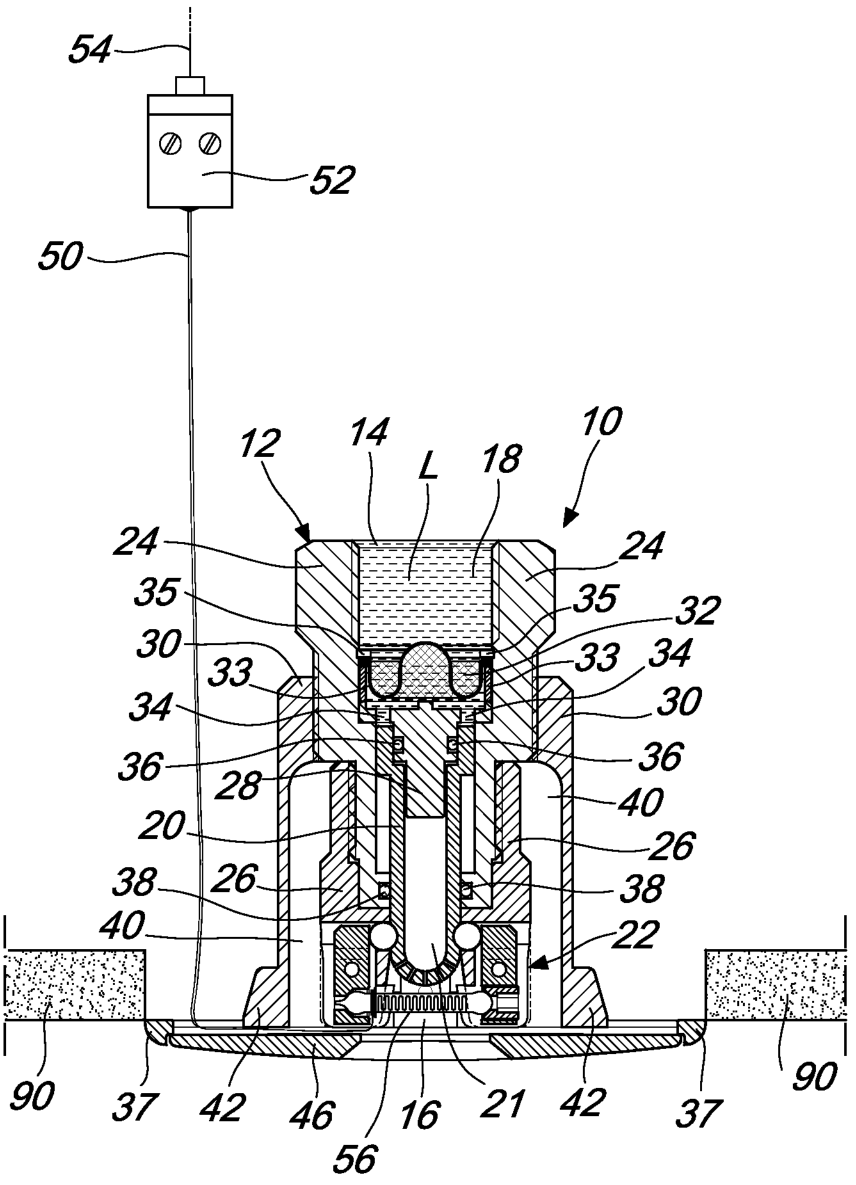
FIGS. 1A and 1B are longitudinal cross-sectional views—the former being an assembly view and the latter being a detailed view—of an embodiment of the atomizer nozzle according to the present invention in an inactive status.

With particular reference to FIGS. 1A-1D, 2A, and 2B, the atomizer nozzle for the automatic dispensing of a liquid L, generally denoted by the reference numeral 10, substantially comprises a main body 12, a dispensing head 20 and a locking assembly 22.

In particular, the atomizer nozzle 10 according to the invention is adapted to be used in a fire-fighting system, and to be placed or installed in a false ceiling 90 or in a ceiling, for example by way of an appropriate supporting base 37.

Advantageously, the nozzle 10 according to the invention is an atomizer nozzle, i.e. a nozzle configured to dispense the liquid L in atomized form. Preferably, the liquid L is water.

As mentioned, the atomizer nozzle 10 according to the invention comprises a main body 12. In general, the shape of the main body 12 can be chosen from any of the shapes known in the field of nozzles. In any case, the main body 12 comprises an inlet 14, an outlet 16, and a cavity 18.

The inlet 14 of the main body 12 is configured to be fed with the liquid L. In particular, the inlet 14 is adapted to be connected to a supply duct—for dispensing the liquid L—of the fire-fighting system.

For example, this connection is realized via a threading provided in the main body 12 proximate to the inlet 14, so that the atomizer nozzle 10 can be screwed to a complementary threading on an outlet of the supply duct of the fire-fighting system.

The supply duct of the fire-fighting system is adapted to maintain a supply pressure of the atomizer nozzle 10 at a substantially constant value. Preferably, the supply pressure of the atomizer nozzle 10 is approximately 20 bar.

The cavity 18 of the main body 12 extends from the inlet 14 to the outlet 16 of the main body 12. In practice, the cavity 18 is adapted to convey the liquid L from the inlet 14 to the outlet 16. In other words, the cavity 18 constitutes a transit path for the liquid L to be dispensed.

Preferably, the inlet 14 and the outlet 16 are aligned along the cavity 18.

In some preferred embodiments, the main body 12 has a longitudinal extension, and the inlet 14 and the outlet 16 are arranged at two opposite longitudinal ends of the main body 12. However, this arrangement is not limiting. For example, in other embodiments (not shown), the inlet 14 can be provided in a surface comprised between the two opposite longitudinal ends of the main body 12.

In a preferred embodiment, the main body 12 longitudinally extends along a central axis, with respect to which the main body 12 is preferably symmetrical. Preferably, the cavity 18 longitudinally extends along the central axis. Preferably, the inlet 14 and the outlet 16 are aligned along the central axis. Alternatively, the inlet 14 can be arranged transversely with respect to the central axis.

Advantageously, the main body 12 includes an occlusion element 28, interposed between the inlet 14 and the outlet 16. The occlusion element 28 is configured to partially occlude the cavity 18.

In particular, the occlusion element 28 is positioned transversely with respect to the cavity 18. Moreover, the occlusion element 28 comprises, or defines, at least one passage opening 34.

In practice, the at least one passage opening 34 places a region downstream of the occlusion element 28 in fluid communication with a region upstream of the occlusion element 28.

For example, the occlusion element 28 comprises a plurality of passage openings 34, which are arranged around a protruding portion of the occlusion element 28.

Advantageously, the occlusion element 28 can include a sealing ring 36, for example an O-ring. When the dispensing head 20 is in an inactive status, the sealing ring 36 is interposed between the dispensing head 20 and an appropriate seat provided in the occlusion element 28.

Advantageously, the main body 12 can include a filtering element 32, arranged upstream of the occlusion element 28. Preferably, the filtering element 32 is a wave filter.

Advantageously, the main body 12 can include one or more annular elements 33, 35, which are adapted to fix the filtering element 32 and the occlusion element 28 inside the cavity 18.

As mentioned, the atomizer nozzle 10 according to the invention further comprises a dispensing head 20. The dispensing head 20 is movable along the cavity 18, for example in the manner shown in FIGS. 1A and 2A. Furthermore, the dispensing head 20 is configured to dispense the liquid L beyond the outlet 16, and therefore outside the atomizer nozzle 10, for example in the manner shown in FIGS. 2A and 2B. Advantageously, the dispensing head 20 is a hollow body and comprises a cavity 21.

Advantageously, the dispensing head 20 is movable from a closed position, in which the dispensing head 20 closes (or obstructs) the cavity 18, to an open position, in which the dispensing head 20 at least partially opens the cavity 18.

In other words, in the closed position, the dispensing head 20 constitutes a barrier to a passage of fluid, in particular of the liquid L, from the inlet 14 to the outlet 16 through the cavity 18. For example, when the dispensing head 20 is in the closed position, the dispensing head 20 closes each passage opening 34 of the occlusion element 28.

In practice, when the inlet 14 is connected to the supply duct of the fire-fighting system, the closed position prevents the dispensing head 20 from dispensing the liquid L.

By contrast, in the open position, the dispensing head 20 puts the outlet 16 in fluid communication with the inlet 14. For example, when the dispensing head 20 is in the open position, the dispensing head 20 opens each passage opening 34 of the occlusion element 28.

In some preferred embodiments, the dispensing head 20 comprises a feeding portion, open toward the inlet 14, and a dispensing portion, configured to occupy the outlet 16.

In embodiments that comprise the occlusion element 28, the feeding portion of the dispensing head 20 is configured to engage the protruding portion of the occlusion element 28.

Advantageously, the dispensing portion of the dispensing head 20 is provided with one or more dispensing holes 70, which are configured to dispense the liquid L outside the nozzle 10, in atomized form.

As mentioned, the atomizer nozzle 10 according to the invention further comprises a locking assembly 22. The locking assembly 22 is configured to lock the dispensing head 20 in a locked position. In the locked position, the dispensing head 20 is at a distance D from the outlet 16. In other words, the locking assembly 22 is configured to provide a removable locking of the dispensing head 20.

In the locked position, the dispensing head 20 is locked with respect to the locking assembly 22.

Figure 1B:
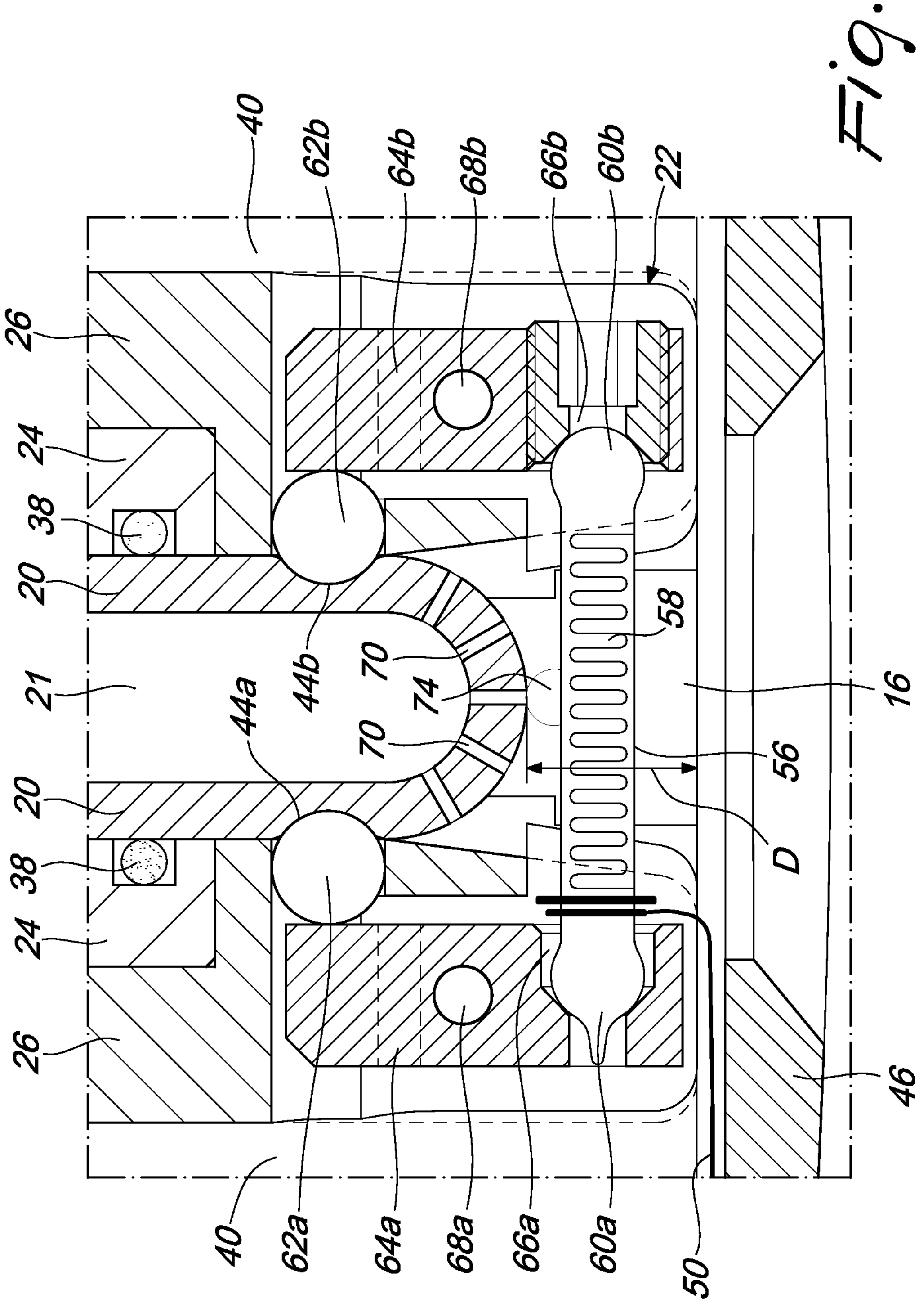
Figure 1C:
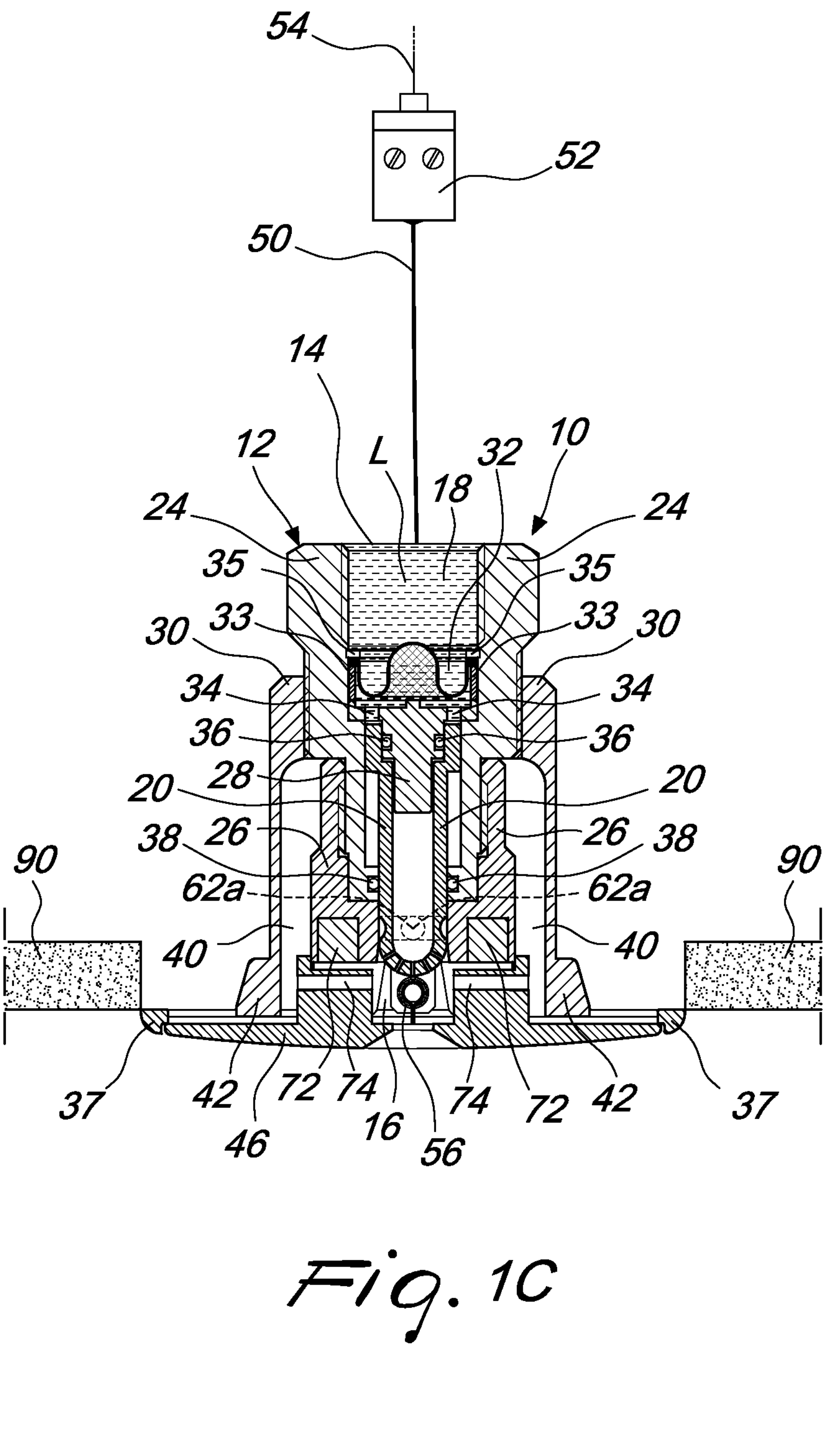
Figure 1D:
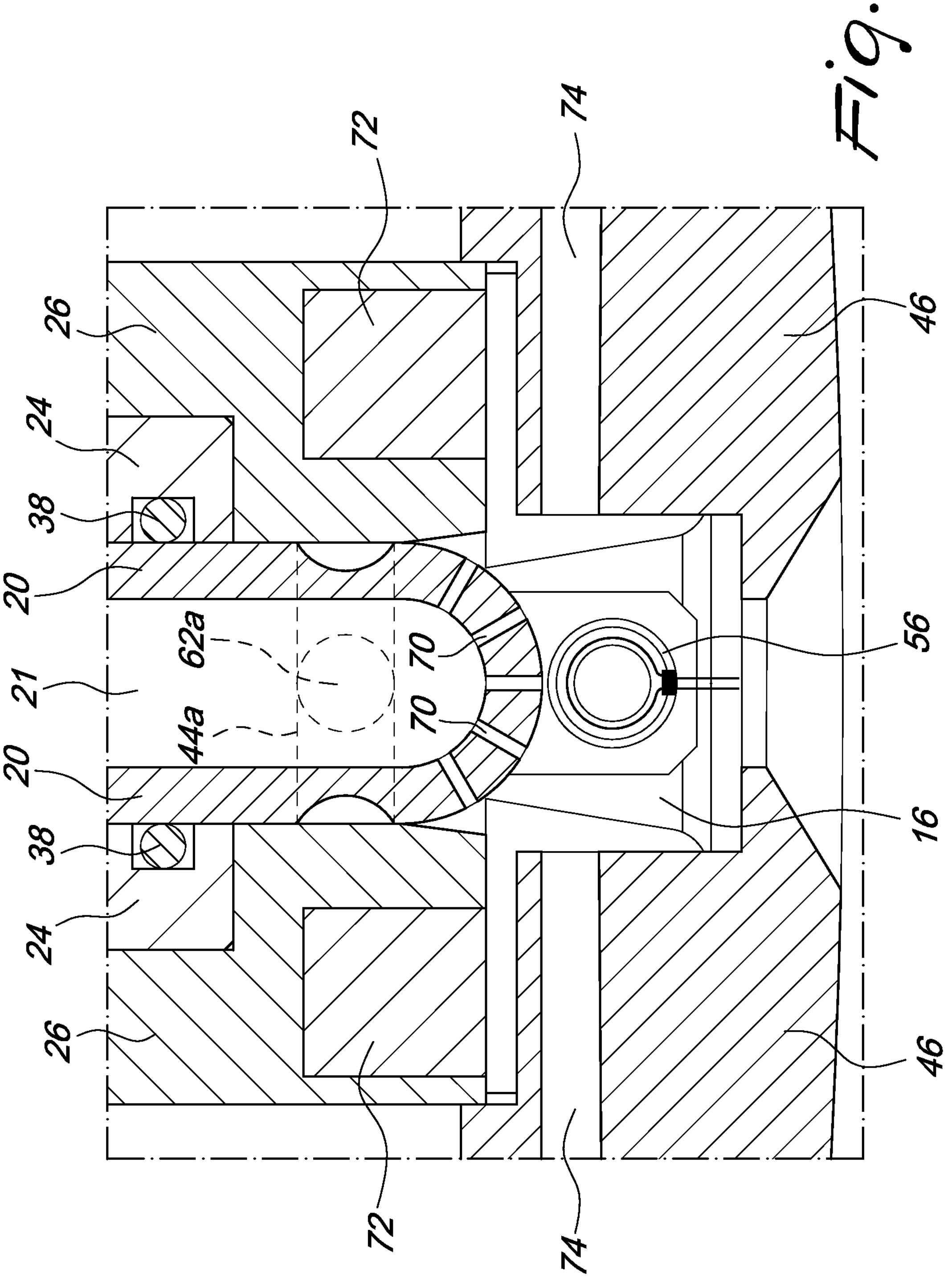
Figure 2A:
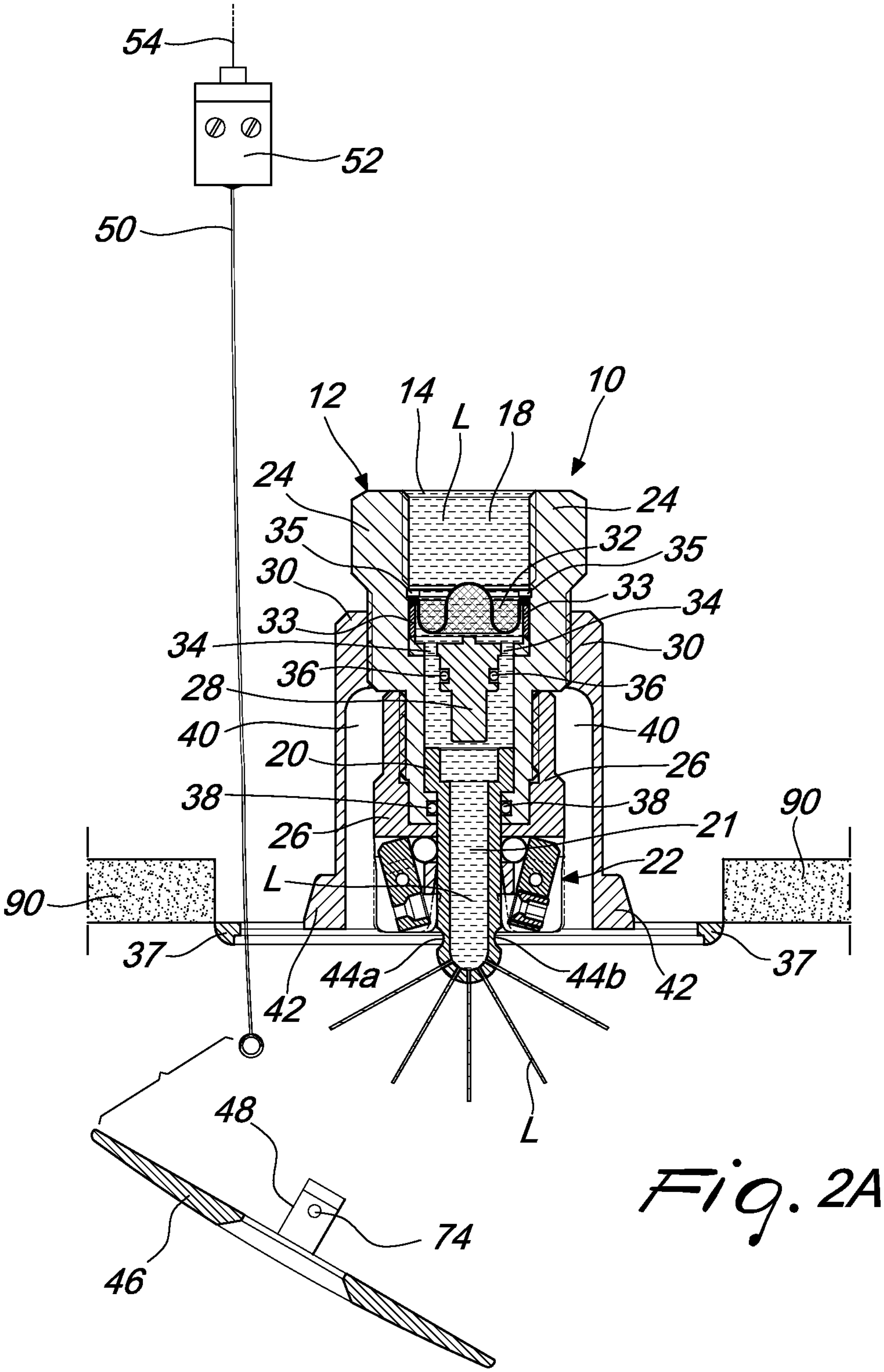
FIGS. 2A and 2B are longitudinal cross-sectional views—the former being an assembly view and the latter being a detailed view—of the atomizer nozzle shown in FIGS. 1A-1D in a dispensing status.
Figure 2B:
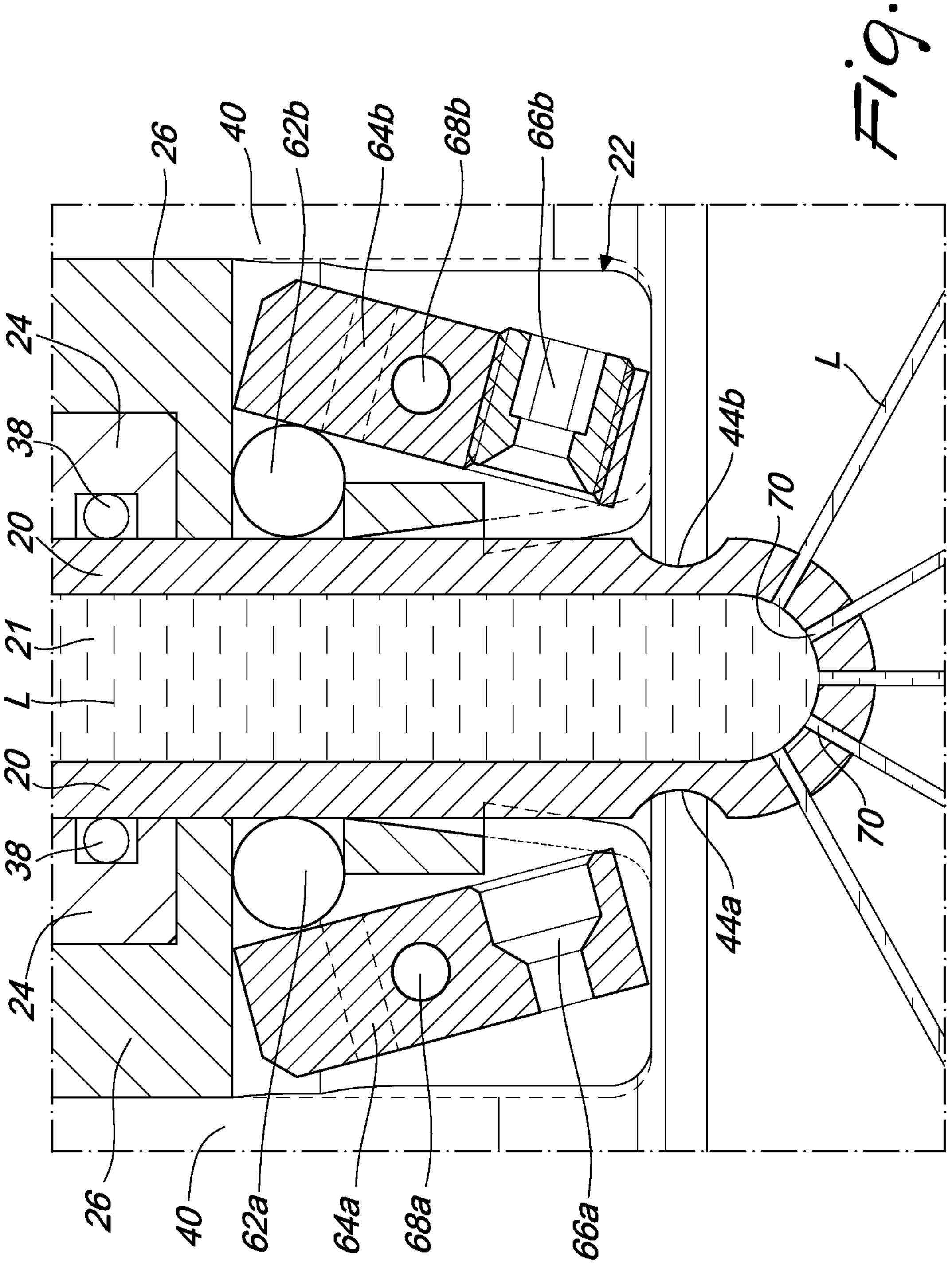

In some operative conditions, for example in the inactive status shown in FIGS. 1A and 1B, the locked position of the dispensing head 20 corresponds to the closed position of the dispensing head 20. In other operative conditions, e.g. during the flow test shown in FIG. 5, the locked position of the dispensing head 20 corresponds to the open position of the dispensing head 20.

Furthermore, the locking assembly 22 comprises a thermosensitive element 56, i.e. an element configured to detect a preset change in temperature and make it manifest. Specifically, the thermosensitive element 56 is configured to break at a predetermined temperature, and the locking assembly 22 is configured to automatically release the dispensing head 20 from the locked position when the thermosensitive element 56 reaches the predetermined temperature.

In particular, the breakage of the thermosensitive element 56 can occur by explosion, owing to an expansion of a fluid, preferably in the liquid state, contained inside the thermosensitive element 56.

Preferably, the thermosensitive element 56 of the locking assembly 22 is made of glass. Alternatively, the thermosensitive element 56 of the locking assembly 22 is made of a material that is designed to melt under heat.

In practice, when the inlet 14 is connected to the supply duct of the fire-fighting system, the breakage of the thermosensitive element 56 at the predetermined temperature causes a release of the dispensing head 20. Under the action of the pressure exerted by the liquid L, the dispensing head 20 moves along the cavity 18, thus reducing—until eliminating—the distance D that separates the dispensing head 20 from the outlet 16. When the dispensing head 20 protrudes from the outlet 16, the dispensing head 20 dispenses the liquid L outside the nozzle 10 in atomized form.

In other words, the breakage of the thermosensitive element 56 of the locking assembly 22 enables an automatic activation of the atomizer nozzle 10, in particular of the dispensing head 20, and therefore an automatic dispensing of the liquid L from the atomizer nozzle 10.

The predetermined temperature, (i.e. the temperature at which the thermosensitive element 56 is configured to break) is determined at the design stage of the atomizer nozzle 10, depending on the applications of use of that spray nozzle 10.

Preferably, the thermosensitive element 56 is bulb-shaped. For example, the thermosensitive element 56 shown in FIGS. 1A, 1B, 3 and 4 is in the shape of a cylinder, ending in two bulb-shaped ends 60*a*, 60*b*.

In a preferred embodiment, the thermosensitive element 56 extends transversely with respect to the cavity 18 of the main body 12, for example in the manner shown in FIGS. 1A, 1B, 3 and 4.

In a preferred embodiment, the atomizer nozzle 10 according to the invention comprises an electric heating element 58 which is thermally connected to the thermosensitive element 56 of the locking assembly 22. In other words, the thermosensitive element 56 of the locking assembly 22 preferably comprises an electric heating element (i.e. a resistor) 58.

Preferably, the electric heating element 58 is applied, for example by way of molding, to an outer surface (or a casing) of the thermosensitive element 56, for example in the manner shown in FIGS. 1A, 1B, 3 and 4. Alternatively, the electric heating element 58 is arranged inside the thermosensitive element 22.

The electric heating element 58 makes it possible to heat the thermosensitive element 56, by Joule effect. In practice, when the electric heating element 58 is passed through by an electric current, the electric heating element 58 dissipates electrical power in the form of heat, thereby heating the thermosensitive element 56 to the predetermined temperature.

The electric heating element 58 is configured to heat the external surface (or casing) of the thermosensitive element 56 directly.

Advantageously, the atomizer nozzle 10 according to the invention is operatively connectable to an electronic control unit 96 of a fire-fighting system 11. Advantageously, the electric heating element 58 is electrically connectable to the electronic control unit 96 of the fire-fighting system 11.

The presence of the electric heating element 58 is particularly advantageous if the atomizer nozzle 10 according to the invention is operatively connected to the electronic control unit 96 of a fire-fighting system 11. In this case, the electric heating element 58 is electrically connected to the electronic control unit 96 of the fire-fighting system 11. Below, the electronic control unit 96 of the fire-fighting system is in short referred to as the "control unit 96".

For example, the atomizer nozzle 10 can be operatively connected to the control unit 96 by way of an electric connector 52, which in turn is connected to the atomizer nozzle 10 by way of a first electric cable 50, and to the control unit 96 by way of a second electric cable 54. Similarly, the electric heating element 58 can be electrically connected to the control unit 96 by way of the electric connector 52, which in turn is connected to the electric heating element 58 by way of a first electric cable 50, and to the control unit 96 by way of a second electric cable 54. Preferably, the first electric cable 50 is a flat cable, i.e. a cable of the ribbon type.

In practice, when the control unit 96 receives a fire signal, for example originating from a fire-prevention sensor, the control unit 96 can supply electricity to the electric heating element 58, and consequently command the breakage of the thermosensitive element 56 of the locking assembly 22.

As mentioned, the breakage of the thermosensitive element 56 of the locking assembly 22 enables an automatic activation of the atomizer nozzle 10, in particular of the dispensing head 20, and therefore an automatic dispensing of the liquid L from the atomizer nozzle 10.

Hence, the presence of the electric heating element 58 and of the control unit 96 enables an activation of the atomizer nozzle 10 by electric command.

In general, the fire-fighting system according to the invention, generally designated by the reference numeral 11, comprises at least one spray nozzle 10 as described above.

Figure 3:
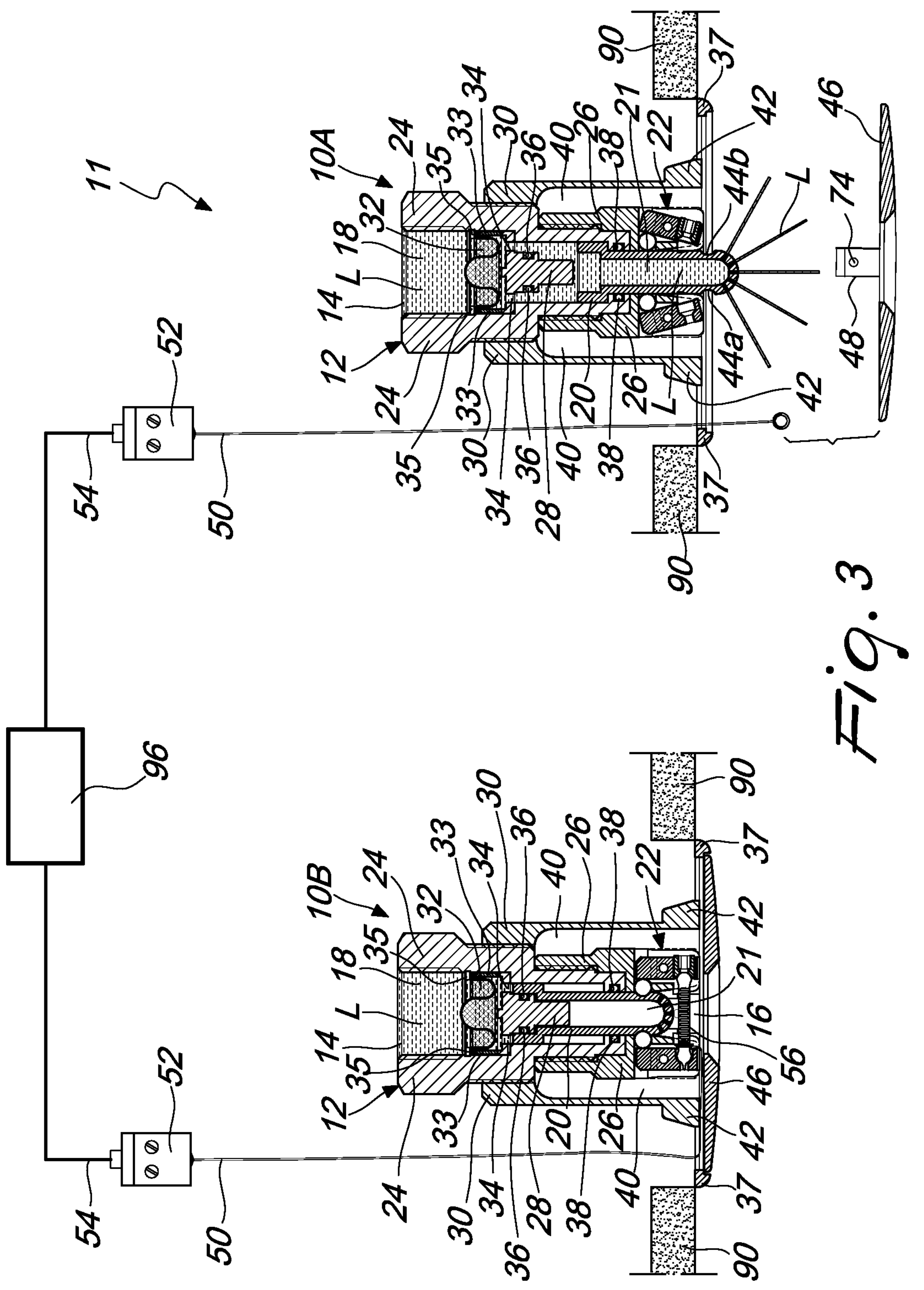
FIG. 3 is a longitudinal cross-sectional view of an embodiment of the fire-fighting system according to the present invention, which comprises a pair of atomizer nozzles for the automatic dispensing of a liquid according to the present invention, wherein a first atomizer nozzle of the pair is in a dispensing status and a second atomizer nozzle of the pair is in an inactive status.

With particular reference to FIG. 3, in a preferred embodiment, the fire-fighting system 11 according to the invention comprises at least one first atomizer nozzle 10A, at least one second atomizer nozzle 10B and an electronic control unit 96. In this preferred embodiment, each of the first atomizer nozzle 10A and the second atomizer nozzle 10B comprises a respective electric heating element 58, which is thermally connected to the thermosensitive element 56 of the respective locking assembly 22, and is electrically connected to the control unit 96 of the fire-fighting system 11.

Preferably, the first atomizer nozzle 10A and the second atomizer nozzle 10B are adjacent, i.e. close to each other, for example by being placed or installed in a same false ceiling 90 or in a same ceiling.

The control unit 96 is configured to detect a rupture of the thermosensitive element 56 of the locking assembly 22 of the first atomizer nozzle 10A. The control unit 96 is capable of detecting the rupture of the thermosensitive element 56 because this rupture implies the rupture also of the electric heating element 58 of the thermosensitive element 56, thereby causing the opening of a closed electrical circuit in which a minimum control current circulates. As a consequence of the rupture of the electric heating element 58 of the thermosensitive element 56, the control unit 96 does not detect any circulation of current, and thus determines that the thermosensitive element 56 is broken.

The control unit 96 is further configured to supply electric power to the electric heating element 58 of the thermosensitive element 56 of the locking assembly 22 of the second atomizer nozzle 10B, thereby commanding a rupture (i.e. actuating the breakage) of the thermosensitive element 56 of the locking assembly 22 of the second atomizer nozzle 10B as a result of (i.e. responsive to) the aforesaid detection of the rupture of the thermosensitive element 56 of the locking assembly 22 of the first atomizer nozzle 10A.

The electric heating element 58 of the first atomizer nozzle 10A is electrically connected to the control unit 96. The electric heating element 58 of the second atomizer nozzle 10B is electrically connected to the control unit 96.

Returning to the atomizer nozzle 10 according to the invention, the locking assembly 22 advantageously comprises at least one locking member 62*a*, 62*b* and at least one lever member 64*a*, 64*b*. In other words, the locking assembly 22 comprises a number of locking members 62*a*, 62*b* that is equal to the number of lever members 64*a*, 64*b*. For example, in the atomizer nozzle 10 shown in the figures, the locking assembly 22 comprises a first locking member 62*a*, a second locking member 62*b*, a first lever member 64*a* and a second lever member 64*b*.

Each locking member 62*a*, 62*b* is configured to engage a respective hollow portion 44*a*, 44*b* of an external surface (i.e. of a surface that faces toward the outside of the atomizer nozzle 10) of the dispensing head 20.

In some preferred embodiments, the hollow portions 44*a*, 44*b* belong to a single, same groove. Where present, this single groove makes it possible to compensate for any imprecision in the positioning of the at least one locking member 62*a*, 62*b*. In other embodiments, the hollow portions 44*a*, 44*b* are separate cavities. In other words, each one of the hollow portions 44*a*, 44*b* constitutes a seat for a respective locking member 62*a*, 62*b*.

In practice, when each locking member 62*a*, 62*b* engages the respective hollow portion 44*a*, 44*b*, the dispensing head 20 is locked in the locked position, for example in the manner shown in FIGS. 1A, 1B, 3 and 4.

Each lever member 64*a*, 64*b* is configured to move the respective locking member 62*a*, 62*b* away from the respective hollow portion 44*a*, 44*b* of the dispensing head 20 when the thermosensitive element 56 breaks.

Specifically, each lever member 64*a*, 64*b* comprises an upper portion, which is operatively connected to the respective locking member 62*a*, 62*b*. For example, each upper portion of the lever members 64*a*, 64*b* can be in contact with the respective locking member 62*a*, 62*b*.

Furthermore, each lever member 64*a*, 64*b* comprises a lower portion, which is operatively connected to the thermosensitive element 56. For example, each lower portion of the lever members 64*a*, 64*b* defines a respective housing 66*a*, 66*b* for a respective end 60*a*, 60*b* of the thermosensitive element 56. Preferably, one of the housings 66*a*, 66*b* is threaded, and the thermosensitive element 56 is screwed into the threaded housing.

In other words, each locking member 62*a*, 62*b* is operatively connected to the thermosensitive element 56 by way of the respective lever member 64*a*, 64*b*.

Advantageously, the main body 12 comprises a pivot (or peg) 68*a*, 68*b* for each lever member 64*a*, 64*b*. Furthermore, each lever member 64*a*, 64*b* is rotatably coupled to the respective pivot 68*a*, 68*b*. As a consequence, each lever member 64*a*, 64*b* is configured to rotate about the respective pivot 68*a*, 68*b*. Preferably, the lever member 64*a*, 64*b* and the respective pivot 68*a*, 68*b* are coupled at a central portion of the same lever member 64*a*, 64*b*.

In practice, in the event of breakage of the thermosensitive element 56, each lever member 64*a*, 64*b* rotates around the respective pivot 68*a*, 68*b*, thus moving the respective locking member 62*a*, 62*b* away from the respective hollow portion 44*a*, 44*b* of the dispensing head 20. As a consequence, the dispensing head 20 is promptly and automatically released.

As mentioned, in a preferred embodiment, the thermosensitive element 56 extends transversely with respect to the cavity 18 of the main body 12. In this embodiment, the thermosensitive element 56 comprises a first end 60*a*, coupled to the first lever member 64*a*, and a second end 60*b*, coupled to the second lever member 64*b*. In other words, the first lever member 64*a* and the first locking member 62*a* are located in a first zone of the main body 12, while the second lever member 64*b* and the second locking member 62*b* are located in a second zone of the main body 12. The first and the second zone of the main body 12 are facing on opposite sides of the cavity 18, preferably symmetrically.

In practice, as long as the thermosensitive element 56 does not break, the specific positioning of the thermosensitive element 56 and of the two lever members 64*a*, 64*b* with respect to the cavity 18 prevents a rotation of the lever members 64*a*, 64*b* around the respective pivots 68*a*, 68*b*. As a result, the thermosensitive element 56 enables the locking members 62*a*, 62*b* to firmly engage the respective hollow portions 44*a*, 44*b* of the dispensing head 20, up to the predetermined temperature.

In a preferred embodiment, each locking member 62*a*, 62*b* is a rolling body which abuts against an inner surface (i.e. against a surface which faces towards the inside of the atomizer nozzle 10) of the upper portion of the respective lever member 64*a*, 64*b*. In other words, in this specific embodiment, each locking member 62*a*, 62*b* is configured to rotate along a respective rolling track realized inside the main body 12, for example in the manner shown in FIGS. 1A, 1B, 2A and 2B. Preferably, each rolling body 62*a*, 62*b* is spherical in shape.

In practice, when the thermosensitive element 56 breaks, the presence of a rolling body as described above facilitates a distancing of the locking member 62*a*, 62*b* from the respective hollow portion 44*a*, 44*b* of the dispensing head 20. This effect is particularly amplified in case the locking members 62*a*, 62*b* are ball members, which entail less friction and a lower risk of seizure.

In some preferred embodiments, the main body 12 further comprises an upper half-body (or an upper half-casing) 24 and a lower half-body (or a lower half-casing) 26.

The upper half-body 24 comprises the inlet 14, while the lower half-body 26 comprises the outlet 16 and accommodates the locking assembly 22.

The occlusion element 28, if any, is preferably positioned inside the upper half-body 24.

Advantageously, the main body 12, in particular the upper half-body 24, can include a sealing ring 38, for example an O-ring, interposed between the dispensing head 20 and an adapted seat provided in the main body 12.

The lower half-body 26 is coupled to the upper half-body 24 in a movable manner, i.e. the lower half-body 26 is coupled to the upper half-body 24 and is movable with respect to the upper half-body 24.

In particular, the lower half-body 26 can rotate with respect to the upper half-body 24, preferably by way of appropriate threading present both on the lower half-body 26 and on the upper half-body 24. For example, an internal threading of the lower half-body 26 can engage an external complementary threading of the upper half-body 24.

As mentioned, the lower half-body 26 is movably coupled to the upper half-body 24. Specifically, the lower half-body 26 is movable between a first operating position, in which the dispensing head 20 obstructs the cavity 18, and a second operating position, in which the dispensing head 20 puts the outlet 16 in fluid communication with the inlet 14. In both the first and the second operating positions, the locking assembly 22 locks the dispensing head 20 in the locked position.

The effects that derive from these two operating positions of the lower half-body 26 will be discussed in more detail below in the description, with particular reference to the flow test.

Advantageously, the lower half-body 26 comprises a gripping portion, which preferably possesses a polygonally-shaped transverse cross-section.

Figure 4:
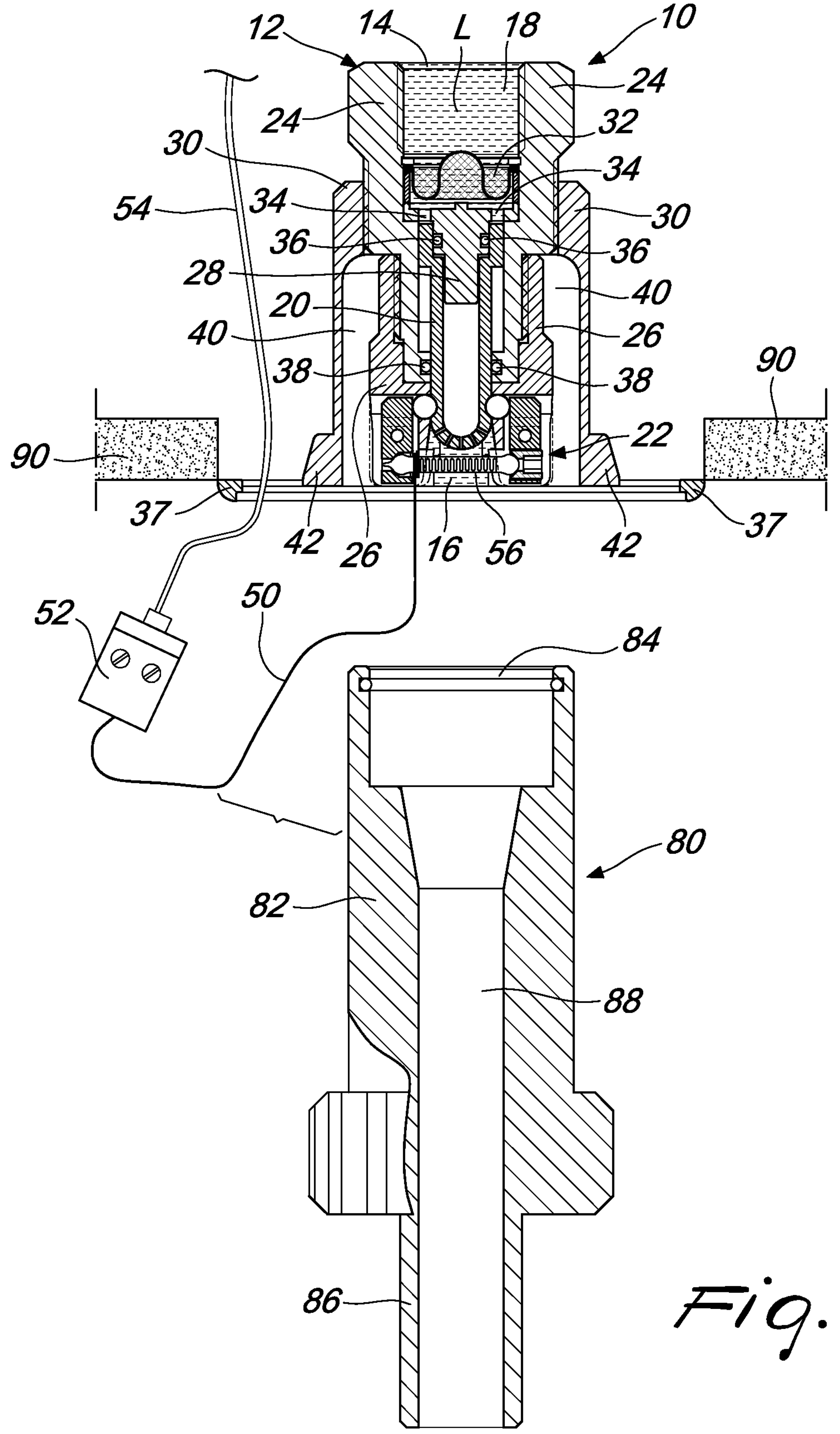
FIG. 4 is a longitudinal cross-sectional view of the embodiment of the atomizer nozzle shown in FIGS. 1A-2B, and of an embodiment of the gripping tool.
Figure 5:
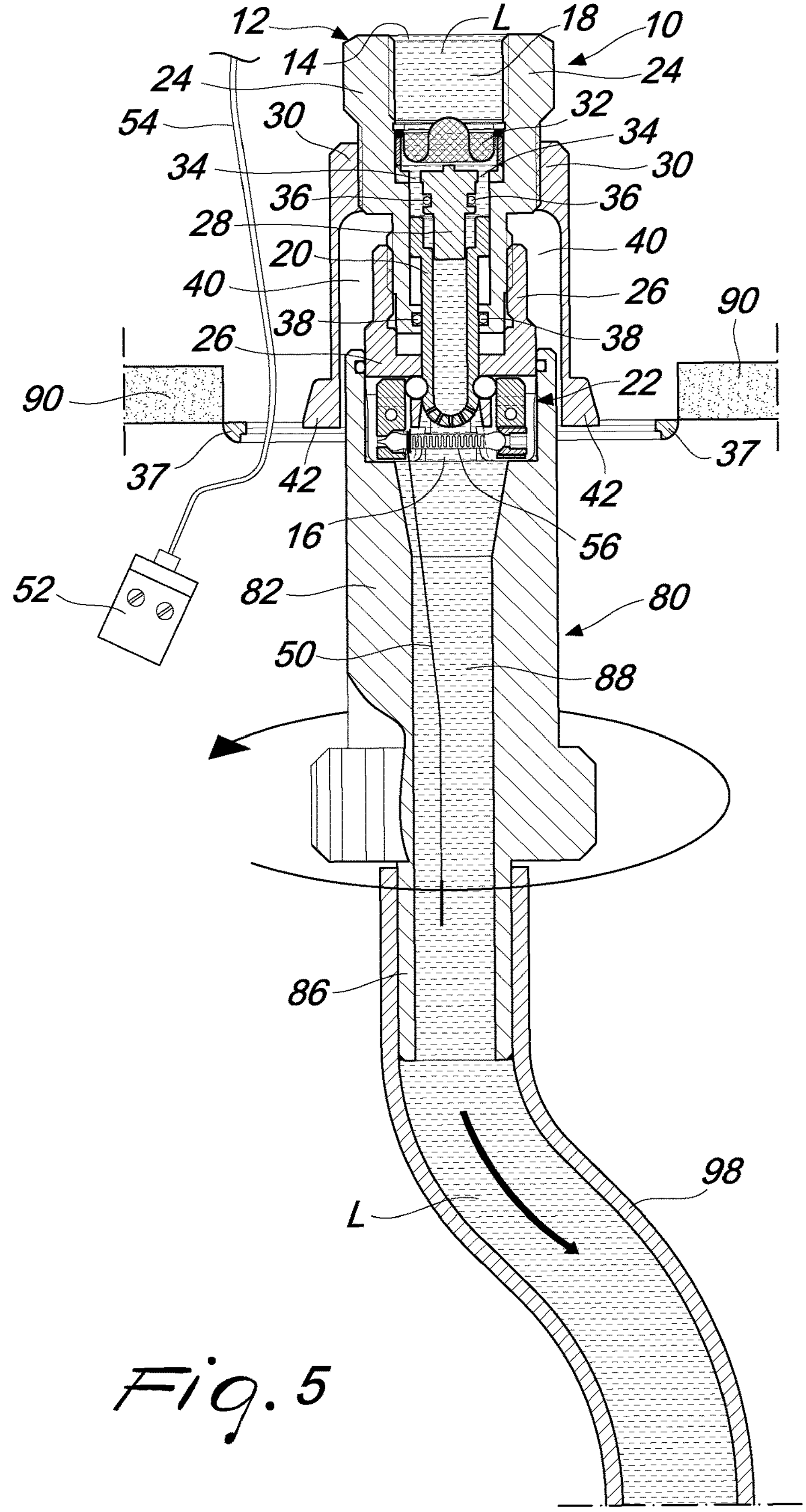
FIG. 5 is a longitudinal cross-sectional view, during a flow test, of the atomizer nozzle shown in FIGS. 1A-2B, and of the gripping tool shown in FIG. 4.
Figure 6A:
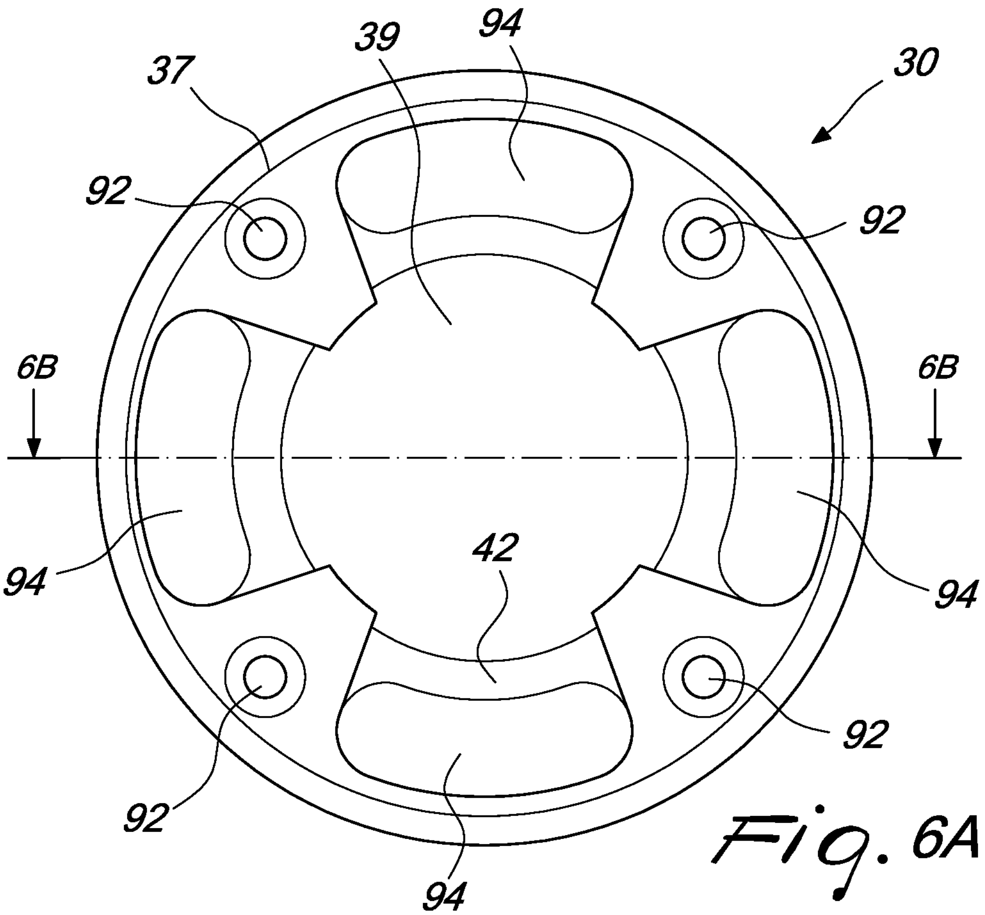
FIGS. 6A and 6B are respectively a plan view from below and a longitudinal cross-sectional view of an embodiment of a supporting element of the atomizer nozzle according to the present invention.
Figure 6B:
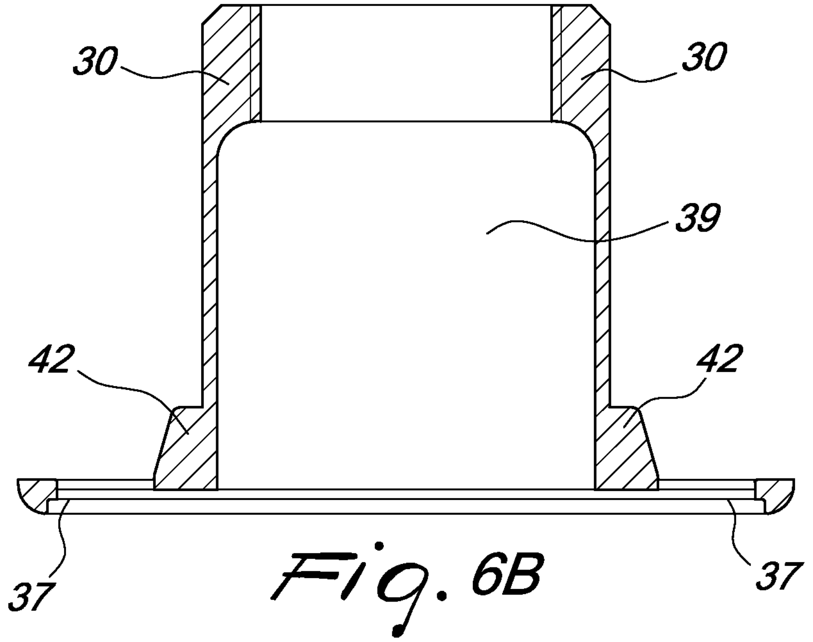
Figure 7A:
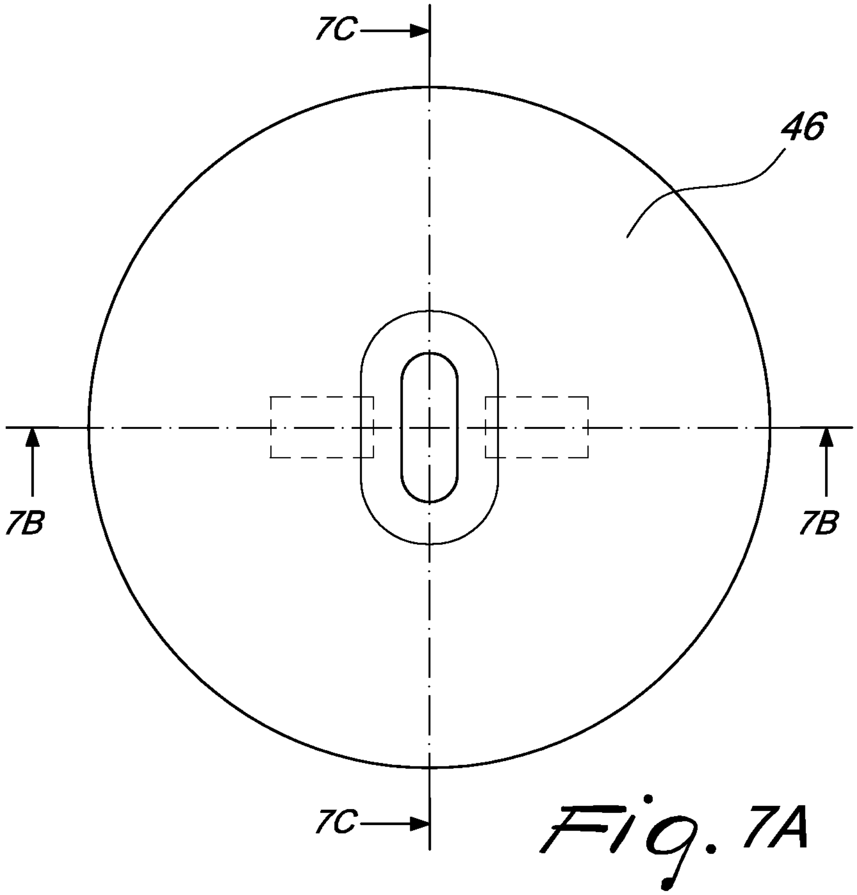
FIGS. 7A, 7B and 7C are respectively a plan view from below and two longitudinal cross-sectional views, rotated by 90° with respect to each other, of an embodiment of a cap (or cover) of the atomizer nozzle according to the present invention.
Figure 7B:
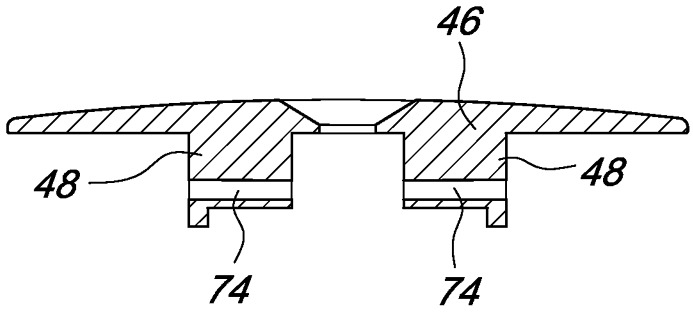
Figure 7C:
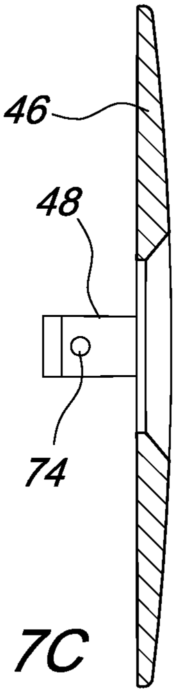

The function of the gripping portion is to facilitate a mounting—or an at least partial dismounting—of the lower half-body 26 with respect to the upper half-body 24, by way of a gripping tool 80, such as for example the one shown in FIGS. 4 and 5.

In a preferred embodiment, the main body 12 and, thus, the upper half-body 24 and the lower half-body 26, are substantially metallic elements. For example, the main body 12 and, thus, the upper half-body 24 and the lower half-body 26, can consist essentially of an alloy of steel, preferably stainless steel, more preferably an austenitic alloy of stainless steel.

Preferably, the main body 12 (and, thus, the upper half-body 24 and the lower half-body 26), the occlusion element 28 (if any), the dispensing head 20 and the at least one lever member 64*a*, 64*b* are essentially made of the same material.

With particular reference to FIGS. 1A to 2B, 6A and 6B, in some preferred embodiments, the atomizer nozzle 10 further comprises a supporting element 30, which is configured to support the main body 12 when the atomizer nozzle 10 is arranged or installed in the false ceiling 90.

The supporting element 30 is configured to be coupled to the main body 12, preferably by way of an appropriate threading and/or by way of other conventional mechanical coupling means, such as a bayonet coupling system, holes for screws, etc.

For example, the supporting element 30 can be screwed to the main body 12, in particular to an external surface (i.e. to a surface which faces toward the outside of the atomizer nozzle 10) of the upper half-body 24.

Advantageously, the supporting element 30 is a hollow body and comprises a cavity 39. Advantageously, the supporting element 30 is shaped like a cup perforated in the bottom. In other words, the supporting element 30 comprises a bottom portion and a flanged portion, wherein the bottom portion has a central opening, and wherein the flanged portion protrudes coaxially from the bottom portion with respect to the central opening. In this manner, when the supporting element 30 fits over the main body 12, an internal wall of the supporting element 30 and an external wall of the main body 12 are separated by a slit 40. For example, the slit 40 can separate the flanged portion of the supporting element 30 from the lower half-body 26 of the main body 12.

The slit 40 allows the main body 12 to be accessible from the outside of the atomizer nozzle 10 even after the coupling between the supporting element 30 and the main body 12. This aspect is particularly advantageous during a maintenance, or an inspection, of the atomizer nozzle 10.

In a particularly advantageous embodiment, the supporting element 30 is dimensioned to allow an insertion of the gripping tool 80 into the slit 40, for example in the manner shown in FIG. 5.

With particular reference to FIGS. 1A, 1C, 2A, and 7A to 7C, in some preferred embodiments, the atomizer nozzle 10 further comprises a cap (or cover) 46, which is configured to at least partially cover a lower face of the main body 12, the lower face comprising the outlet 16.

In some preferred embodiments, the cap 46 comprises at least one ferromagnetic insert (i.e. an insert made of ferromagnetic material) 74. Preferably, the ferromagnetic insert 74 extends longitudinally, i.e. is shaped like a peg. Conveniently, the cap 46 comprises one or more fasteners 48. The ferromagnetic insert 74 can be included in a respective fastener 48 of the cap 46.

With particular reference to FIGS. 1A, 1C, 2A, 6A and 6B, the supporting element 30 can comprise a supporting base 37, which is configured to support the cap 46 when the atomizer nozzle 10 is arranged or installed in the false ceiling 90.

Conveniently, the supporting base 37 of the supporting element 30 comprises one or more screw holes 92, which are adapted to facilitate the arrangement or the installation of the atomizer nozzle 10 in a false ceiling 90 or in a ceiling.

Conveniently, the supporting base 37 of the supporting element 30 comprises one or more slots 94, which are adapted to facilitate the passage of the electrical connection (for example of a portion of the first electric, preferably flat, cable 50) between the control unit 96 and the atomizer nozzle 10 (in particular, between the control unit 96 and the electric heating element 58 of the thermosensitive element 56 of the locking assembly 22).

Again, with particular reference to FIGS. 1A, 1C, 2A, 6A and 6B, the supporting element 30 can comprise an outer ring (i.e. a crown) 42, preferably protruding from an external surface (i.e. from a surface which faces towards the outside of the atomizer nozzle 10) of a lower portion of the supporting element 30.

With particular reference to FIGS. 1C, 1D, 2A and 7A to 7C, in some preferred embodiments, the main body 12, in particular the lower half-body 26, further comprises at least one magnet 72 (e.g. a magnet of the neodymium type) which is adapted to hold the cap (or cover) 46 in place, in particular with respect to the supporting base 37 of the supporting element 30. As mentioned, the cap 46 can comprise at least one insert made of ferromagnetic material 74, and this ferromagnetic insert 74 can be included in a respective fastener 48 of the cap 46. In practice, the magnet 72 keeps the cap 46 in position by attracting the ferromagnetic insert 74 included in the cap (or cover) 46.

In other embodiments (not shown), the main body 12, in particular the lower half-body 26, includes one or more fastening seats, which are adapted to be engaged by one or more respective fasteners 48 of the cap 46.

With particular reference to FIGS. 4 and 5, the gripping tool 80 is configured to engage the lower half-body 26 of the main body 12 of the atomizer nozzle 10. For example, the gripping tool 80 comprises a gripping mouth 84, which is designed to engage the gripping portion of the lower half-body 26.

Advantageously, the gripping tool 80 is a hollow body, and comprises a cavity 88. For example, the gripping tool 80 shown in FIGS. 4 and 5 extends from a distal portion 82 to a proximal portion 86, wherein the distal portion 82 includes the gripping mouth 84, and wherein the proximal portion 86 is in fluid communication with the distal portion 42 through the cavity 88 of the gripping tool 80.

Advantageously, the gripping tool 80 is configured to move the lower half-body 26 from the first operating position to the second operating position, for example by rotating the lower half-body 26 through a certain number of degrees (for example 360°) in the direction of the arrow shown in FIG. 5.

Advantageously, the gripping tool 80 is also configured to execute the reverse operation, i.e. move the lower half-body 26 from the second operating position to the first operating position, for example by rotating the lower half-body 26 in the direction opposite to that of the arrow shown in FIG. 5.

Optionally, the gripping tool 80 can further include a plug or socket, which is configured to engage a free terminal of the first electric cable 50.

When the atomizer nozzle 10 and the associated cap 46 (if any) are installed in the false ceiling 90 and are connected to the supply duct of the fire-fighting system, for dispensing the liquid L, the atomizer nozzle 10 according to the invention operates in the manner described below.

In the event of breakage of the thermosensitive element 56 of the locking assembly 22, the dispensing head 20 is released in the manner described above. As a consequence of this breakage and, thus, of this release, the dispensing head 20 moves downwards along the cavity 18 of the main body 12, from the closed position to the open position, owing to the thrust exerted by the liquid L under pressure. By moving downwards along the cavity 18 of the main body 12, the dispensing head 20 exerts on the cap 46 a pressure which ejects (or expels) the cap 46 from the respective fastening seats, thereby allowing a dispensing of the liquid L outside the atomizer nozzle 10.

Situations like, for example, periodically checking the correct operation of the atomizer nozzle 10 can require verifying that the liquid L is capable of flowing correctly inside and then outside of the atomizer nozzle 10. In such situations, the two operative positions of the lower half-body 26 are particularly advantageous for conducting this checking without having to break the thermosensitive element 56.

Specifically, a flow test of the atomizer nozzle 10 according to the invention, i.e. a method of checking the flow of the liquid L inside the atomizer nozzle 10 described above, comprises substantially the steps described below:

S.1. engaging the gripping tool 80 with the lower half-body 26 of the main body 12, for example in the manner shown in FIG. 5; and S.2. moving the lower half-body 26 from the first operating position to the second operating position, by way of the gripping tool 80, for example in the manner shown in FIG. 5.

For example, a rotation of the lower half-body 26 in the anticlockwise (or clockwise) direction with respect to the upper half-body 24 can cause a lowering of the lower half-body 26 with respect to the upper half-body 24. Since the locking assembly 22 keeps the dispensing head 20 in the locked position, the dispensing head 20 moves integrally with the lower half-body 26, thereby freeing the passage openings 34 which e.g. are comprised in the occlusion element 28.

As a consequence, the transition from the first operating position to the second operating position of the lower half-body 26 puts the outlet 16 in fluid communication with the inlet 14, thereby enabling the dispensing of the liquid L without needing to break the thermosensitive element 56.

Therefore, an advantageous kit can comprise the above-described atomizer nozzle 10 for the automatic dispensing of a liquid L, and the gripping tool 80, wherein the gripping tool 80 is configured to execute steps S.1 and S.2 of the flow test described above.

Obviously, if the cap 46 is fastened to the lower half-body 26 or to the supporting element 30, the flow test can also comprise a preliminary step S.0A, which consists of removing the cap 46, for example manually.

Advantageously, if the supporting element 30 is present in the atomizer nozzle 10, step S.1 above can comprise the insertion of the gripping tool 80 into the slit 40, for example in the manner shown in FIG. 5.

Advantageously, if the atomizer nozzle 10, in particular the electric heating element 58, is connected to the control unit 96, the flow test can further comprise a preliminary step S.0B, which consists of disconnecting the first electric cable 50 from the connector 52, and inserting the first electric cable 50 in the cavity 88 of the gripping tool 80.

Optionally, the above kit can further comprise a flexible hose 98, which is configured to be engaged with the proximal portion 86 of the gripping tool 80.

The presence of the flexible hose 98 is particularly advantageous during the flow test, to convey the liquid L from the cavity 88 of the gripping tool 80 in a desired direction.

In practice it has been found that the present invention fully achieves the set aim and objects. In particular, it has been seen that the so-conceived atomizer nozzle for the automatic dispensing of a liquid makes it possible to overcome the qualitative limitations of the known art, in that it makes it possible to obtain better effects than those that can be obtained with conventional solutions and/or similar effects at lower cost and with higher performance levels.

An advantage of the atomizer nozzle according to the present invention consists in that, as a consequence of its placement or installation, it is at least partially, preferably completely, contained, and therefore concealed, in the false ceiling or ceiling of a room.

Another advantage of the atomizer nozzle according to the present invention consists in that it emerges at least partially from the false ceiling or ceiling of a room in the event of activation, and therefore in a dispensing status.

Another advantage of the atomizer nozzle according to the present invention consists in that it can be activated, and therefore can pass to a dispensing status, both autonomously (and thus independently of an optional fire-prevention sensor and an optional electronic control unit of a fire-fighting system) and following an electrical command originating from an electronic control unit of a fire-fighting system.

Further, an advantage of the atomizer nozzle according to the present invention consists in that it is relatively simple to maintain.

Although the atomizer nozzle according to the invention has been conceived in particular for use in fire-fighting systems with automatic dispensing, it can in any case be used, more generally, for any type of automatic dispensing system placed or installed in rooms of high prestige, for example art galleries, museums, hotels, etc.

The invention, thus conceived, is susceptible of numerous modifications and variations, all of which are within the scope of the appended claims.

Except where indicated otherwise, the various embodiments described above can be combined in order to provide further and/or alternative embodiments. In addition, the present description covers combinations of variations and preferred embodiments that are not explicitly described.

Moreover, all the details may be substituted by other, technically equivalent elements.

In practice the materials employed, provided they are compatible with the specific use, and the contingent dimensions and shapes, may be any according to requirements and to the state of the art.

In conclusion, the scope of protection of the claims shall not be limited by the explanations or by the preferred embodiments illustrated in the description by way of examples, but rather the claims shall comprise all the patentable characteristics of novelty that reside in the present invention, including all the characteristics that would be considered as equivalent by the person skilled in the art.

The disclosures in Italian Patent Application No. 102022000026025 from which this application claims priority are incorporated herein by reference.

What is claimed is:

1. An atomizer nozzle for automatic dispensing of a liquid for fire-fighting systems, said atomizer nozzle comprising:
- a main body, comprising:
  - an inlet, configured to be supplied with said liquid,
  - an outlet, and
  - a cavity, extending from said inlet to said outlet;
- a dispensing head, movable along said cavity, said dispensing head being configured to dispense said liquid beyond said outlet and, therefore, outside said atomizer nozzle; and
- a locking assembly, configured to lock said dispensing head in a locked position at a distance from said outlet;
- wherein said locking assembly comprises a thermosensitive element configured to break at a predetermined temperature, said locking assembly being further configured to automatically release said dispensing head from said locked position when said thermosensitive element reaches said predetermined temperature;
- wherein said dispensing head is further configured to:
- move along said cavity when released, thereby reducing said distance until said distance is eliminated, and
- dispense said liquid by protruding from said outlet;
- wherein said main body further comprises an upper half-body and a lower half-body, wherein said upper half-body comprises said inlet, wherein said lower half-body comprises said outlet, said locking assembly being accommodated in said lower half-body, and wherein said lower half-body is coupled to said upper half-body in a movable manner; and
- wherein said lower half-body is movable between a first opening position, in which said locking assembly locks said dispensing head in said locked position while said dispensing head obstructs said cavity, and a second operating position, in which said locking assembly locks said dispensing head in said locked position but said dispensing head puts said outlet in fluid connection with said inlet.

2. The atomizer nozzle according to claim 1, further comprising an electric heating element which is thermally connected to said thermosensitive element of said locking assembly, the electric heating element being electrically connectable to an electronic control unit of a fire- fighting system.

3. The atomizer nozzle according to claim 2, wherein said electric heating element is applied to an outer surface of said thermosensitive element of said locking assembly.

4. The atomizer nozzle according to claim 1, wherein said locking assembly further comprises:
- at least one locking member, configured to engage a respective hollow portion of an external surface of said dispensing head; and
- at least one lever member, configured to move a respective locking member away from said respective hollow portion of said dispensing head when said thermosensitive element breaks.

5. The atomizer nozzle according to claim 4, wherein said at least one lever member of said locking assembly comprises:
- an upper portion, operatively connected to said respective locking member; and
- a lower portion, operatively connected to said thermosensitive element.

6. The atomizer nozzle according to claim 4, wherein said main body further comprises a pivot for each lever member of said locking assembly, each lever member being rotatably coupled to said respective pivot.

7. The atomizer nozzle according to claim 6, wherein said at least one lever member of said locking assembly and said respective pivot of said main body are coupled at a central portion of said at least one lever member.

8. The atomizer nozzle according to claim 4, wherein said at least one locking member of said locking assembly is a rolling body which abuts against an internal surface of said at least one lever member.

9. The atomizer nozzle according to claim 4, wherein said at least one lever member of said locking assembly comprises a first lever member and a second lever member, wherein said thermosensitive element of said locking assembly extends transversely with respect to said cavity of said main body, said thermosensitive element comprising a first end and a second end, said first end being coupled to said first lever member, and said second end being coupled to said second lever member.

10. The atomizer nozzle according to claim 1, further comprising a cap configured to cover at least partially a lower face of said main body, wherein said dispensing head is further configured to eject said cap by moving along said cavity when released.

11. The atomizer nozzle according to claim 10, wherein said cap comprises at least one ferromagnetic insert, and wherein said main body further comprises at least one magnet, the at least one magnet being adapted to keep said cap in position by attracting said ferromagnetic insert of said cap.

12. A kit comprising:
- said atomizer nozzle according to claim 1, and
- a gripping tool, which is configured to:
- engage said lower half-body of said main body, and move said lower half-body from said first operating position to said second operating position, and vice versa, by way of a rotation.

13. A fire-fighting system comprising said atomizer nozzle according to claim 1.

14. A fire-fighting system comprising:

at least one first atomizer nozzle according to claim 1, at least one second atomizer nozzle according to claim 1, and an electronic control unit configured to:

perform detection of a rupture of said thermosensitive element of said locking assembly of said first atomizer nozzle, and supply electric power to an electric heating element of said thermosensitive element of said locking assembly of said second atomizer nozzle, thereby commanding a rupture of said thermosensitive element of said locking assembly of said second atomizer nozzle as a result of said detection.

* * * * *